United States Patent [19]

Fabian et al.

[11] 4,065,170

[45] Dec. 27, 1977

[54] FRONT SECTION OF A MOTOR VEHICLE, ESPECIALLY OF A PASSENGER MOTOR VEHICLE

[75] Inventors: Frank-Dietrich Fabian, Rommelshausen; Rainer Leucht, Stuttgart, both of Germany

[73] Assignee: Daimler-Benz Aktiengesellschaft, Germany

[21] Appl. No.: 612,353

[22] Filed: Sept. 11, 1975

[30] Foreign Application Priority Data

Sept. 12, 1974 Germany .............................. 2443636

[51] Int. Cl.² ........................................... B60R 11/00
[52] U.S. Cl. .................... 296/37.1; 98/2.06; 180/54 A; 180/68.5; 237/12.3 A
[58] Field of Search ............... 296/37 R, 28 F, 28 G, 296/28 R, 91, 1S; 180/54 A, 64 A, 68.5, 89, 1 H; 15/250.31; 98/2, 2.06, 2.07, 2.15; 237/12.3 A; 224/42.42 R, 42.43

[56] References Cited

U.S. PATENT DOCUMENTS

| | | | |
|---|---|---|---|
| 1,501,832 | 7/1924 | Amend | 180/68.5 X |
| 1,552,320 | 9/1925 | Lea | 180/68.5 |
| 2,143,889 | 1/1939 | Ledwinka | 180/64 A X |
| 2,306,833 | 12/1942 | Thannhauser | 180/68.5 |
| 2,429,732 | 10/1947 | Roos | 180/1 H |
| 2,614,654 | 10/1952 | Strinden | 180/54 A X |
| 2,664,308 | 12/1953 | Appel | 180/68.5 X |
| 2,696,774 | 12/1954 | Bayley | 98/2.06 |
| 2,895,157 | 7/1959 | Kocourek | 296/28 R X |
| 2,998,280 | 8/1961 | Barenyi | 296/28 R |
| 3,205,964 | 9/1965 | Henry-Biabaud | 180/54 A |
| 3,773,127 | 11/1973 | Aaen et al. | 180/54 A X |
| 3,788,681 | 1/1974 | Barenyi et al. | 296/28 R |

FOREIGN PATENT DOCUMENTS

| | | | |
|---|---|---|---|
| 1,296,495 | 5/1962 | France | 296/37 R |
| 704,526 | 5/1931 | France | 296/37 R |
| 327,878 | 4/1930 | United Kingdom | 296/37 R |

OTHER PUBLICATIONS

BMW Owner's Manual, Printed 12/20/72, pp. 6, 12, 46, front and rear covers.

*Primary Examiner*—Joseph F. Peters, Jr.
*Assistant Examiner*—Michael J. Forman
*Attorney, Agent, or Firm*—Craig & Antonelli

[57] ABSTRACT

A front section of a motor vehicle, especially of a passenger motor vehicle, in which a separate space for auxiliary aggregates is formed with the aid of a partition arranged in front of the passenger space end wall and of a bottom; the aggregate space is thereby separated from the remaining area of the engine space and is closed off in the upward direction by the hood.

30 Claims, 4 Drawing Figures

FRONT SECTION OF A MOTOR VEHICLE, ESPECIALLY OF A PASSENGER MOTOR VEHICLE

The present invention relates to a front section of a motor vehicle, especially of a passenger motor vehicle, with an engine space delimited in the upward direction by a pivotal hood, toward the sides by longitudinal bearers and wheel casings and toward the rear by an end wall closing off the passenger space, which accommodates an engine and additional aggregates.

It is known to accommodate the additional aggregates necesary for an engine as well as installations for venting and heating the passenger space as well as further servo-installation in part in the engine space and in part in the passenger space. The compactness which one aims at in modern motor vehicles leads to difficulties, especially since the number and size of the auxiliary aggregates is increased by reason of special wishes and technical improvements. The aggregates accommodated in the engine space can be serviced in part only with difficulty and in a complicated manner which leads to an increase in the cost of the service work. The aggregates accommodated in the passenger space, for example, fuses or electrical control apparatus or the like have to be serviced from the passenger space, which brings about the danger of a soiling of the passenger space.

The arrangement of the aggregates in the engine space which, for the most part is haphazardous, impairs the air outflow out of the engine space so that the danger exists that the auxiliary aggregates are heated up and may be impaired in the length of life thereof. It is known for that reason to provide relatively expensive protective measures for endangered aggregates, for example, a battery ventilation.

As a result of the disorganized accommodation and installation of the aggregates in the engine space, a standardization and systematization for different engines cannot be realized.

Additionally, this arrangement leads to an unfavorable assembly at the assembly line during the manufacture, especially since the aggregates can be damaged during the engine installation. It is additionally unfavorable that the aggregates are exposed to strong soiling in the engine space which is open in the downward direction. Furthermore, such an engine space does not offer a sufficient space nor a favorable space for the accommodation and mounting of parts of an exhaust gas decontamination installation which have to be cooled in a special manner.

The present invention is concerned with the task to so construct the front section of a motor vehicle of the aforementined type that the auxiliary aggregates are accommodated in a protected manner and that a good space utilization and favorable space subdivision is obtained so that cooling air streams can be conducted also in the engine space which can be utilized for the cooling of certain auxiliary aggregates and apparatus. The present invention essentially consists in that with the aid of a partition arranged in front of the end wall and of a bottom, a space for the aggregates, separated from the remaining area of the engine space is formed which is closed toward the top by means of the hood.

It becomes possible by this construction to accommodate the aggregates in an orderly manner according to a predetermined system within the aggregate space provided therefor and to protect the same with respect to the remaining area of the engine space. The aggregates are protected thereby both against undesired heat-up as also against soiling. Additionally, the area surrounding the engine is kept free so that an advantageous air conduction and air guidance is possible on the inside of the engine space, which additionally can be utilized as cooling air flow for adjoining auxiliary aggregates, especially parts of an exhaust gas decontamination system. The danger of a damage to the auxiliary aggregates during the subsequent installation of the engine is also barred. Additionally, the advantage results that the front section and the engine space can be standardized to a very large extent independently of the used engine type so that the series manufacture is favored.

In one advantageous embodiment of the present invention, a transverse partition is arranged at a distance in front of and essentially parallel to the end wall, which partition extends between the oppositely disposed wheel casing that adjoin the longitudinal bearers in the upward direction. The thus-formed aggregate space can be very readily separated from the remaining engine space whereby a very good space utilization is obtained. Simultaneously, the advantage is obtained that the area of the frame or support structure disposed in front of the end wall (fire wall) is significantly reinforced which is to be considered as an advantage for safety reasons. Cross bearers which are frequently present in this area can be thereby dispensed with.

According to another embodiment of the present invention, a tunnel extending from the engine space to the rear axle of the vehicle and formed of one or several sheet metal members is provided, which is extended forwardly beyond the end wall and is connected to the transverse partition. In this manner, the tunnel customarily provided for covering off a transmission and the cardan shaft adjoining the transmission, is incorporated into the forward area of the support structure. Provision may thereby be made in a particularly advantageous manner that cross bearers are mounted between the tunnel and the longitudinal bearers which consist of the bottom of the aggregate space and of sheet metal members forming together with the same hollow profile members. This construction leads to a particularly strong and sturdy reinforcement of the area of the vehicle which is disposed directly in front of the end wall.

According to a further feature of the present invention, air guide means are arranged laterally of and/or in front of and below the aggregate space which are directed toward an apparatus to be cooled which is mounted below the end wall extending obliquely downwardly in the lower area thereof and/or in the area of the floor of the vehicle. The installation and mounting of the air guide means becomes possible without difficulty since the engine space, properly speaking, is kept far-reachingly free of auxiliary aggregates so that an unimparied air flow can form which is directed by these air guide means.

Accordingly, it is an object of the present invention to provide a front section of a motor vehicle, especially of a passenger motor vehicle, which avoids by simple means the aforementioned shortcomings and drawbacks encountered in the prior art.

Another object of the present invention resides in a front section of a passenger motor vehicle which permits a far-reaching protection of the auxiliary aggregates as well as easy servicing thereof without impairing the compactness of the vehicle.

A further object of the present invention resides in a front section of a motor vehicle, especially of a passenger motor vehicle, which avoids the danger of soiling the passenger space during servicing of auxiliary aggregates, located in the passenger space.

Still another object of the present invention resides in a front section for a passenger motor vehicle which far-reachingly eliminates the danger of a heat-up of auxiliary aggregates and the impairment of their length of life as a result thereof.

A still further object of the present invention resides in a front section of a passenger motor vehicle which is relatively inexpensive, yet offers a realistic and effective protection for the auxiliary aggregates, and which can be used for standardization and systematization of the auxiliary aggregates, even with the use of different engines.

Another object of the present invention resides in a front section of a motor vehicle which improves the series manufacture of the vehicle without danger of damage to the auxiliary aggregates by the subsequent installation of the engine block.

A further object of the present invention resides in a good space utilization of the engine space together with the possiblity of providing a good cooling air flow for use in particular with exhaust gas decontamination systems parts of which have to be cooled.

A still further object of the present invention resides in a front section for a motor vehicle, especially for a passenger motor vehicle which leads to a substantial reinforcement of the vehicle within areas that are particularly endangered in case of front end collisons.

These and further objects, features and advantages of the present invention will become more apparent from the following description when taken in connection with the accompanying drawing which shows, for purposes of illustration only, two embodiments in accordance with the present invention, and wherein.

Figure 1:
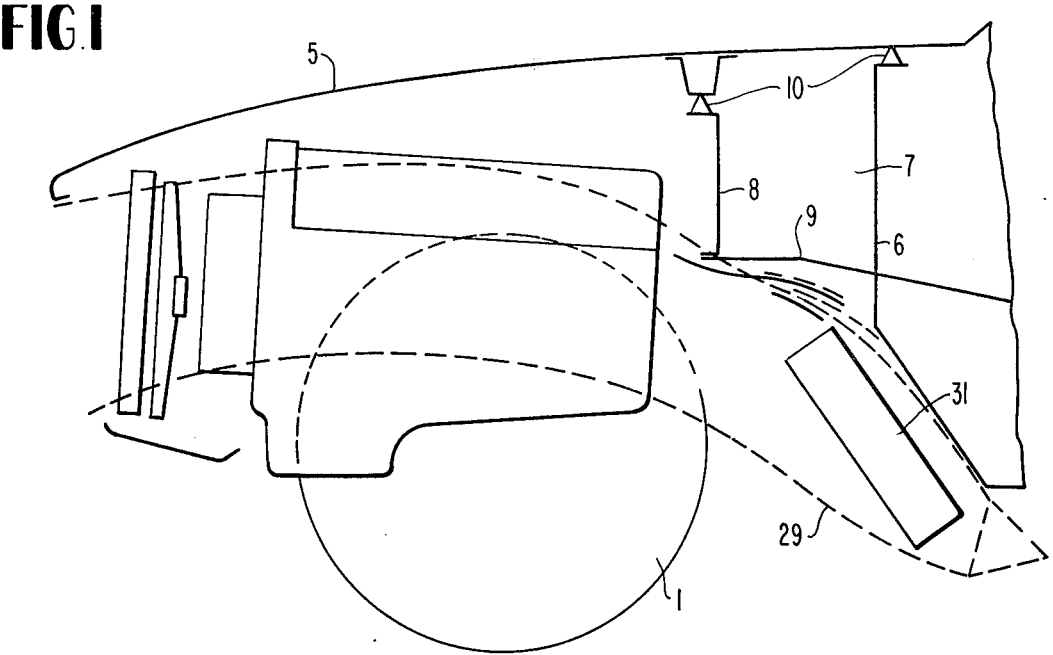
FIG. 1 is a somewhat schematic longitudinal cross-sectional view through a first embodiment of a construction of a front section of a motor vehicle according to the present invention.
Figure 2:
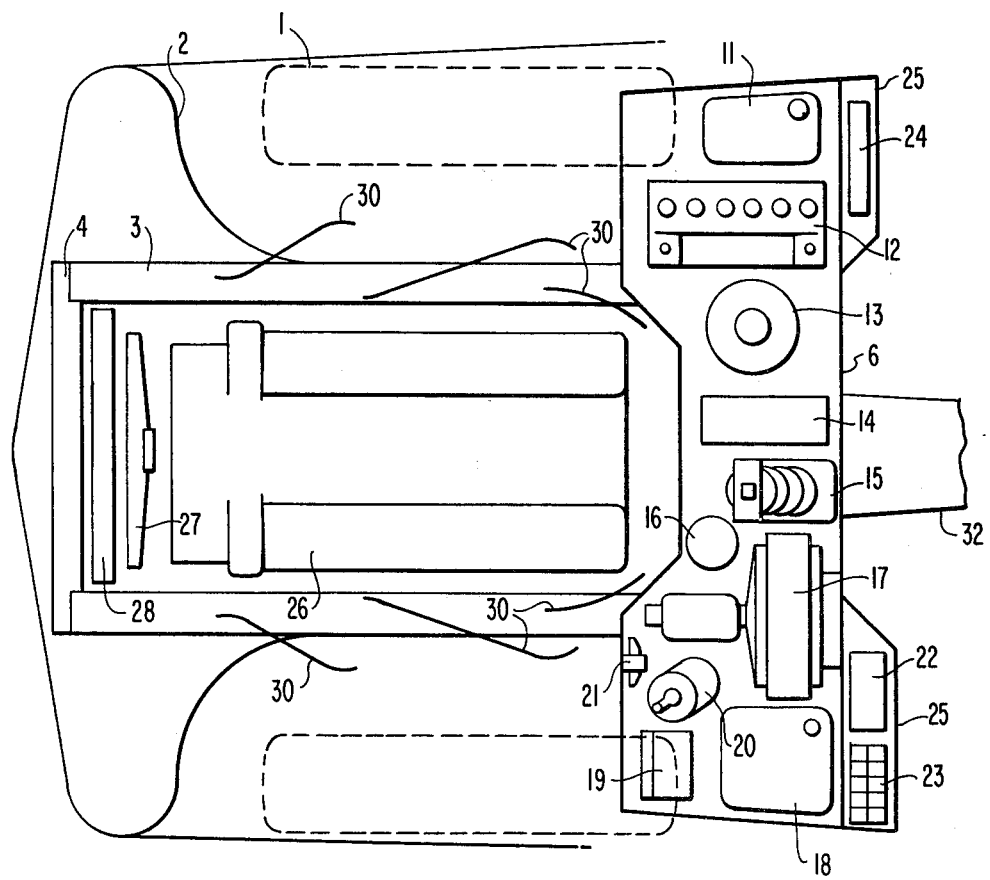
FIG. 2 is a somewhat schematic plan view on the front section according to FIG. 1.

Referring now to the drawing wherein like reference numerals are used throughout the various views to designate like parts, and more particularly to FIGS. 1 and 2, the front section of a passenger motor vehicle illustrated in these two figures, which is located wihtin the area of the front wheels 1, forms an engine space which is delimited on the sides by the wheel casings 2 enclosing the front wheels and by longitudinal bearers 3 adjoining the same in the downward direction. The longitudinal bearers 3 extend up to approximately the vehicle front end. They are connected with each other within this area by a cross bearer 4. In the upward direction, the engine space is closed off by a hood 5 which is pivotally mounted in a manner not illustrated in detail by conventional means preferably about the area of its forward or rearward end. Toward the rear, the engine space is delimited by an end wall 6, such as the fire wall, which separates the passenger space from the engine space and the aggregate space.

In order to be able to accommodate the auxiliary aggregates required for the vehicle in a protected and orderly manner according to a certain system, an aggregate space 7 is separated off from the engine space in that a transverse partition 8 and a bottom 9 are arranged between the two wheel casings 2, which together with the upper portion of the end wall 6 from the aggregate space 7 that is closed off in the upward direction by the hood 5. Sealing profiles 10 are mounted on the upper edge of the end wall 6 and on the upper edge of the transverse partition 8 which effect a sealing of this aggregate space 7 with respect to the remaining part of the engine space and with respect to the outside. The transverse partition wall 8 extends essentially parallel to the end wall 6, however, it includes in the lateral areas bulging-out portions that become larger in the forward direction in order to accommodate within this aggregate space 7 all apparatus, if possible.

According to FIG. 2, for example, an expansion tank 11 for the cooling system, a vehicle battery 12, a supply tank 13 for a level regulation, a hydraulic unit 14 for an antiblocking system, a cruise-control 15, a drier 16 for an air conditioning installation, a brake apparatus 17, a tank 18 for cleaning fluid of a windshield wiper and headlight washer system, a transistorized circuit device 19 for an ignition installation, an ignition coil 20 and series resistances 21, fuses 22, a relay 23 and an electronic control apparatus 24 for a further installation, for example, for an anti-block system are accommodated in the aggregate space 7. The installations 22, 23 and 24 are thereby arranged in bulged-out portions of the lateral area of the end wall 6.

Now only an engine 26 and the auxiliary aggregates directly connected with the same, such as the fan 27 and radiator 28, are now still located in the area of the engine space located in front of the aggregate space 7. A relatively large free space is left between the engine 26 and the wheel casings 2 which rise obliquely toward the sides from the longitudinal bearers 3, which space is not impaired by auxiliary aggregates. As a result thereof, a very effective cooling air stream 29 may now form, which is indicated in FIG. 1 by the dashed lines. This cooling air flow is so directed by additional air guide means 30 mounted in the engine space and fastened at the longitudinal bearers 3 or at the wheel casings 2 that it is conducted to an apparatus to be cooled, for example, to a catalyst 31 of an exhaust gas decontamination system. For example, two such catalysts 31 may be arranged adjacent a tunnel 32, one on each side, which tunnel leads from the engine space to a rear axle (not shown) and which in the first area covers off a change-speed transmission (not shown) and in the rear area a cardan shaft (also not shown).

The aggregate space 7 not only leads to a neat and protected arrangement of the aggregates and to an improved space utilization of the engine space as well as to a favorable cooling air guidance but also to a reinforcement of the vehicle frame or support structure in the area directly in front of the end wall 6.

Figure 3:
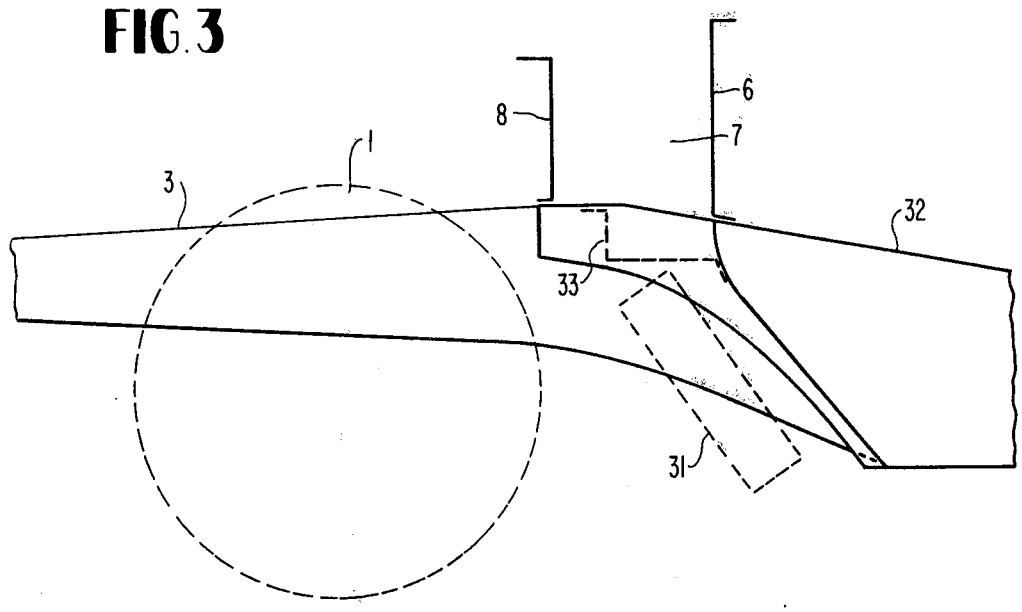
FIG. 3 is a somewhat schematic center longitudinal cross-sectional view through a second embodiment of a front section in accordance with the present invention, in which only those parts belonging to the framework and to the construction are illustrated.
Figure 4:
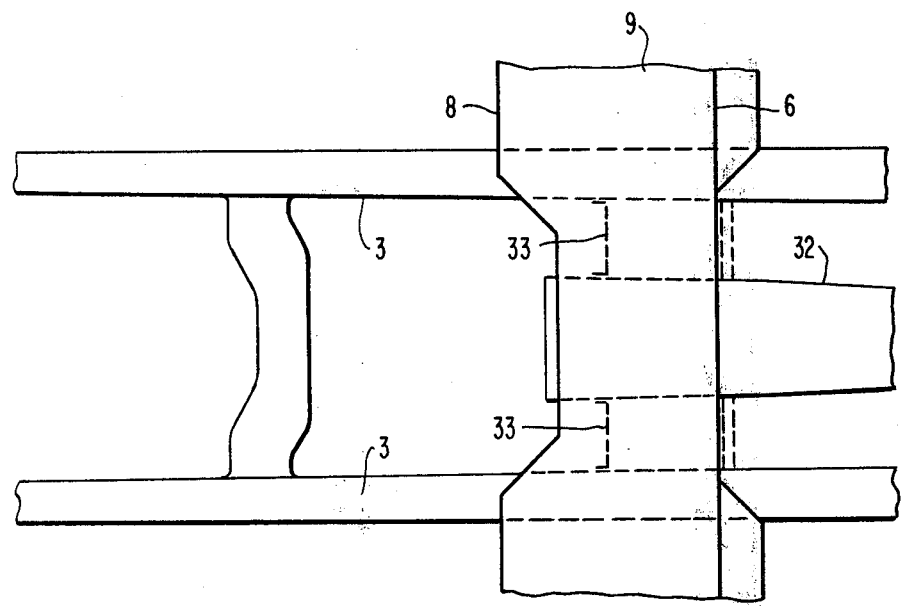
FIG. 4 is a somewhat schematic plan view on FIG. 3.

As can be seen from FIGS. 3 and 4, the tunnel 32 which within this area consists of a curved sheet metal profile member open in the downward direction and whose upper edge extends at the height of the upper edge of the longitudinal bearers 3, is extended forwardly beyond the end wall 6 up to the area of the transverse partition 8, with which it is connected by conventional means. The tunnel 32 can replace in the center the bottom 9 by means of its forwardly extended portion. As a result of this construction, the tunnel belongs to and forms part of the support structure within this area of the vehicle. In order to obtain a further reinforcement, sheet metal profile members 33 are mounted between the tunnel 32 and the lateral longitudinal bearers which form hollow profiles together with the bottom 9 that also extends at the height of the upper edge of the lateral longitudinal bearers 3 and is correspondingly profiled. It is achieved by this construction, that the longitudinal bearers 3 are so supported that a twisting within a plane perpendicular to the vehicle direction is prevented or reduced so that also the front axle construction can be reliably accommodated and supported.

The creation of an aggregate space according to the present invention enables an orderly engine space which can be readily viewed and inspected and therewith a more facilitated and less expensive servicing which additionally does not represent any soiling work since the aggregates can now hardly become still soiled. Additionally, heat-protective measures for the aggregates are not necessary, whereby under certain circumstances less expensive aggregates can be used. The heating-up of the vehicle is prevented by reason of the improved cooling air conduction and guidance, whereby an aimed-at air guidance in the engine space, in the tunnel and underneath the vehicle floor can be carried out. A favorable space for the parts of the exhaust gas decontamination installation is created which can also be better ventilated. The mufflers and the catalysts of such an installation can be accommodated therefore very favorably without thermally loading the passenger space. The necessary lines can be laid out in a simple manner and in neat grouping. As a matter of fact, better assembly possibilities for all aggregates at the assembly line result from the present invention whereby the danger of a damaging of already installed parts due to the subsequent engine installation is no longer present. The double end-wall additionally leads to an improved noise absorption toward the passenger space. Additionally, it is possible to construct the vehicles uniformly within the area of the front section independently of the used engine and to equip the same uniformly with aggregates so that the completed vehicles differ only by the installed engine.

It is also possible to subdivide the aggregate space differently and also at another location, especially to arrange the same in subdivided form to the right and left adjacent the engine. For that purpose, a longitudinal partition, starting from the end wall 6 may be provided on each side of the front section of the vehicle whereas the bottom can be formed by the wheel casing 2. However, it is also possible to close off such an aggregate space in front and/or toward the rear by boundary sheet metal members or the like.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a front section of a motor vehicle having an engine compartment defined by a pivotal hood, by longitudinal bearer members and wheel casings at the sides of the vehicle, and by the end wall of the passenger space, the improvement comprising means for enclosing operational components of said vehicle within said engine compartment separately from the engine, and sealing profile means for sealing said means for separately enclosing said operational components of said vehicle, such that said means for separately enclosing said operational components of said vehicle protects said operational components from environmental conditions both inside and outside said engine compartment.

2. A front section according to claim 1, wherein said means for separately enclosing includes a separate compartment contained within said engine compartment, said separate compartment being defined at least by said pivotal hood, by said end wall of said passenger space, and by at least one partition member arranged in front of said end wall in said engine compartment, and wherein said separate compartment contains said operational components of said vehicle which are protected from environmental conditions both inside and outside said engine compartment.

3. A front section according to claim 2, wherein said separate compartment is further formed by a bottom wall member.

4. A front section according to claim 3, wherein said at least one partition member includes a transverse partition member arranged at a distance in front of and approximately parallel to said end wall of said passenger space, said transverse partition member extending between oppositely disposed wheel casings, said wheel casings adjoining said longitudinal bearer members in the upward direction.

5. A front section according to claim 4, wherein at least said at least one partition member is provided with said sealing profile means abutting from below against said pivotal hood for sealing said separate compartment.

6. A front section according to claim 5, wherein a tunnel means formed by at least one sheet metal member is provided for leading from said engine compartment to a rear axle of the vehicle, said tunnel means being extended forwardly beyond the end wall of said passenger space and being connected to said at least one partition member.

7. A front section according to claim 6, wherein cross bearer members are mounted between said tunnel means and said longitudinal bearer members at the sides of said vehicle.

8. A front section according to claim 7, wherein said cross bearer members include sheet metal members which together with said bottom wall member form hollow profile members.

9. A front section according to claim 8, wherein air guide means are arranged within said engine compartment for circulating air through said engine compartment.

10. A front section according to claim 9, wherein said air guide means are arranged laterally of the engine.

11. A front section according to claim 10, wherein said air guide means are arranged in front of and underneath said separate compartment.

12. A front section according to claim 9, wherein said air guide means are arranged in front of and underneath said separate compartment.

13. A front section according to claim 9, wherein said air guide means direct air toward an apparatus to be cooled which is mounted underneath said end wall of said passenger space extending obliquely rearwardly in the lower area thereof.

14. A front section according to claim 9, wherein said air guide means direct air toward an apparatus to be cooled which is mounted within the area of the floor of the vehicle.

15. A front section according to claim 5, wherein said end wall is also provided with said sealing profile means abutting from below against said pivotal hood for sealing said separate compartment.

16. A front section according to claim 2, wherein said at least one partition member includes at least one longitudinal partition member extending from said end wall of said passenger space, said longitudinal partition member forming together with the wheel casing disposed therebelow said separate compartment disposed laterally of the engine and enclosed in the upward direction by said pivotal hood.

17. A front section according to claim 16, wherein said separate compartment is further formed by the wheel casing and by a forward boundary sheet metal member.

18. A front section according to claim 2, wherein at least said at least on partition member is provided with said sealing profile means abutting from below against said pivotal hood for sealing said separate compartment.

19. A front section according to claim 18, wherein said end wall is also provided with said sealing profile means abutting from below against said pivotal hood for sealing said separate compartment.

20. A front section according to claim 2, wherein a tunnel means formed by at least one sheet metal member is provided for leading from said engine compartment to a rear axle of the vehicle, said tunnel means being extended forwardly beyond the end wall of said passenger space and being connected to said at least one partition member.

21. A front section according to claim 20, wherein cross bearer members are mounted between said tunnel means and said longitudinal bearer members at the sides of said vehicle.

22. A front section according to claim 21, wherein said cross bearer members consist of sheet metal members which together with a bottom wall member of said separate compartment form hollow profile members.

23. A front section according to claim 2, wherein air guide means are arranged within said engine compartment for circulating air through said engine compartment.

24. A front section according to claim 23, wherein said air guide means are arranged laterally of the engine.

25. A front section according to claim 23, wherein said at least one partition member includes at least one longitudinal partition member extending from said end wall of said passenger space, said longitudinal partition member forming together with the wheel casing disposed therebelow said separate compartment disposed laterally of the engine and enclosed in the upward direction by said pivotal hood.

26. A front section according to claim 25, wherein said separate compartment is further formed by the wheel casing and by a forward boundary sheet metal member.

27. A front section according to claim 1, wherein air guide means are arranged within said engine compartment for circulating air through said engine compartment.

28. A front section according to claim 27, wherein said air guide means are arranged laterally of the engine.

29. A front section according to claim 29, wherein said air guide means are arranged in front of and underneath said means for separately enclosing said operational components of said vehicle.

30. A front section according to claim 27, wherein said air guide means are arranged in front of and underneath said means for separately enclosing said operational components of said vehicle.

* * * * *